US011384680B2

(12) United States Patent
Brahmasani et al.

(10) Patent No.: US 11,384,680 B2
(45) Date of Patent: Jul. 12, 2022

(54) SYSTEMS AND METHODS FOR AUTOMOBILE RADIATOR COOLING CONTROL

(71) Applicant: Woven Planet North America, Inc., Los Altos, CA (US)

(72) Inventors: Lakshmaiah Brahmasani, San Francisco, CA (US); Steven Son Khau, Belmont, CA (US); Steve Sichi Chen, Milpitas, CA (US); Srinivasa Rao Damaraju, Fremont, CA (US); David Timothy Milton, San Jose, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 171 days.

(21) Appl. No.: 16/730,787

(22) Filed: Dec. 30, 2019

(65) Prior Publication Data

US 2021/0199042 A1  Jul. 1, 2021

(51) Int. Cl.
*F01P 5/06* (2006.01)
*F01P 7/02* (2006.01)
(Continued)

(52) U.S. Cl.
CPC ............... *F01P 7/026* (2013.01); *B60K 11/04* (2013.01); *F01P 3/18* (2013.01); *F01P 5/06* (2013.01);
(Continued)

(58) Field of Classification Search
CPC .......... F01P 2005/025; F01P 5/06; F01P 5/02; F01P 7/08; F01P 7/164; F01P 11/16;
(Continued)

(56) References Cited

U.S. PATENT DOCUMENTS

| 4,726,324 A | * | 2/1988 | Itakura | ...................... | F01P 7/16 |
| | | | | | 123/41.1 |
| 5,588,482 A | * | 12/1996 | Holka | ................... | B60K 11/08 |
| | | | | | 123/41.49 |

(Continued)

FOREIGN PATENT DOCUMENTS

| EP | 3135879 A1 | 3/2017 | |
| GB | 1282136 A | * 7/1972 | ................ F01P 5/06 |

OTHER PUBLICATIONS

European Patent Office, Partial Search Result for PCT/US20/67034, dated Jan. 20, 2021, 13 pages.

*Primary Examiner* — George C Jin
*Assistant Examiner* — Teuta B Holbrook
(74) *Attorney, Agent, or Firm* — Christopher G. Darrow; Darrow Mustafa PC

(57) ABSTRACT

Systems, methods, and non-transitory computer-readable media provide a cooling component including an underbody wheel well fan that is installed in proximity to the wheel well at each side of the front wheels. Specifically, an apparatus for vehicle radiator cooling control is provided, including a first suction component disposed in proximity to a first wheel well at a first side of a vehicle, a first tube component having a first end connected to the first suction component and a second end extended to a direction towards a back of the vehicle, and a first fan component connected to the second end of the first tube component.

9 Claims, 11 Drawing Sheets

(51) Int. Cl.
 *B60K 11/04* (2006.01)
 *F01P 3/18* (2006.01)
 *F01P 7/08* (2006.01)

(52) U.S. Cl.
 CPC .......... *F01P 7/08* (2013.01); *F01P 2003/185* (2013.01); *F01P 2025/48* (2013.01); *F01P 2025/50* (2013.01)

(58) Field of Classification Search
 CPC ............. F01P 2025/48; F01P 2003/185; F01P 2025/50; F01P 3/18; F01P 7/026; B60K 11/04; B60K 11/06
 See application file for complete search history.

(56) References Cited

U.S. PATENT DOCUMENTS

| | | | | |
|---|---|---|---|---|
| 6,435,264 B1* | 8/2002 | Konno | ............ | F01P 3/18 165/41 |
| 7,537,072 B2* | 5/2009 | Sturmon | ............ | B60K 11/08 180/68.1 |
| 8,020,655 B2* | 9/2011 | Robinson | ............ | F04D 27/002 180/68.1 |
| 8,453,777 B2* | 6/2013 | Farlow | ............ | F04D 17/16 180/68.1 |
| 8,936,122 B2* | 1/2015 | MacGregor | ............ | B60K 11/04 180/68.1 |
| 2006/0185626 A1* | 8/2006 | Allen | ............ | F02M 26/28 123/41.12 |
| 2008/0035400 A1 | 2/2008 | Wong | | |
| 2012/0181001 A1* | 7/2012 | Marsh | ............ | F02B 29/0443 165/121 |
| 2012/0318476 A1* | 12/2012 | Begleiter | ............ | B60K 11/085 165/51 |
| 2013/0153180 A1* | 6/2013 | Montocchio | ............ | B60K 11/04 165/121 |
| 2013/0239913 A1* | 9/2013 | Young | ............ | F01P 7/04 123/41.49 |
| 2013/0319778 A1* | 12/2013 | MacGregor | ............ | B60K 11/04 180/68.1 |
| 2015/0267600 A1* | 9/2015 | Mehravaran | ............ | F01P 5/06 123/41.11 |
| 2015/0361866 A1* | 12/2015 | Baldus | ............ | E01C 23/088 417/364 |
| 2019/0360380 A1* | 11/2019 | Dudar | ............ | B60K 11/02 |

* cited by examiner

SYSTEMS AND METHODS FOR AUTOMOBILE RADIATOR COOLING CONTROL

FIELD OF THE INVENTION

The present technology relates to vehicle systems. More particularly, the present technology relates to systems, apparatus, and methods for automobile cooling system control.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may be installed with a radar unit, along with other sensors such as an inertial measurement unit (IMU), which provides measurement data of objects in the environment that the vehicle is situated at, such that the vehicle can make or assist a human driver to make a navigation decision. As another example, the vehicle may be equipped with a computing system that processes various kinds of measurement data to make control decisions of the vehicle.

As the vehicle usually needs to constantly monitor the environment, the computing system often undertakes heavy processing tasks. The high level of processing capacity may demand a high-power computing system that may often take up a significant physical space in the vehicle and generate a considerable amount of heat that drives up the internal temperature of the vehicle, as well as cause the computing system to operate less efficiently, such as due to high heat. As the computing system often needs to be operated at a certain temperature, the vehicle may demand an efficient cooling system to dissipate the heat from inside the vehicle to bring the temperature down. For example, the cooling system usually circulates a cooling liquid flow, e.g., the coolant, inside the vehicle to conduct or transfer the heat from inside the vehicle to the outer environment. When the space inside the vehicle is limited, especially inside an autonomous vehicle where the computing system itself may occupy significant room, the design and installation of an efficient cooling circulation system within the vehicle can often be challenging.

SUMMARY

In view of the need to improve cooling control of a vehicle, embodiments described herein provide a cooling component including an underbody wheel well fan that is installed in proximity to the wheel well at each side of the front wheels. Specifically, an apparatus for vehicle radiator cooling control is provided, including a first suction component disposed in proximity to a first wheel well at a first side of a vehicle, a first tube component having a first end connected to the first suction component and a second end extended to a direction towards a back of the vehicle, and a first fan component connected to the second end of the first tube component. The first suction component is configured to draw air released from an engine compartment of the vehicle. The first tube component is configured to pass the air from the first suction component to the second end of the first tube component. The first fan component is configured to discharge the air from the first tube component.

In one embodiment, the first suction component is positioned at an angle such that the air released from an air outlet of the engine compartment is sucked into the first suction component.

In one embodiment, the first tube component is positioned substantially in parallel to a left or a right edge of the vehicle such that the second end of the first tube component is placed a specific or predetermined distance away from the first wheel well.

In one embodiment, the first fan component is positioned to blow the air out of the first tube component in an opposite direction of the front side of the vehicle while the first fan is operating.

In one embodiment, the apparatus further includes a second suction component disposed in proximity to a second wheel well at a second side of the front side of the vehicle, a second tube component having a third end connected to the second suction component and a fourth end extended to the direction towards the back of the vehicle, and a second fan component connected to the fourth end of the second tube component.

In one embodiment, a control unit is configured to turn on the first fan component in response to receiving a signal indicating that the vehicle is in an idle condition.

In one embodiment, a control unit is configured to turn on the first fan component in response to receiving a signal indicating that a temperature of the engine compartment or a computing component of the vehicle has exceeded a pre-defined threshold.

In one embodiment, a control unit is configured to receive, from a global positioning system (GPS) component, a signal indicating that the vehicle has arrived at a location that belongs to a pre-defined list of locations relating to high power consumption for operating the vehicle; and turn on the first fan component in response to receiving the signal.

In one embodiment, a first thermal detector is disposed at a first radiator panel at the first side of the vehicle, which is configured to measure a first air inlet temperature at the first radiator panel. A first flow control component is configured to conduct a first flow of heated coolant flow from a cooling mechanism of the vehicle to the first radiator panel in response to a first control signal from a control unit based at least in part on the first air inlet temperature.

In one embodiment, a second thermal detector is disposed at a second radiator panel at a second side of the vehicle, which is configured to measure a second air inlet temperature at the second radiator panel. A second flow control component is configured to conduct a second flow of the heated coolant flow from the cooling mechanism of the vehicle to the second radiator panel in response to a second control signal from the control unit based at least in part on the second air inlet temperature.

In one embodiment, the control unit is configured to compare the first air inlet temperature with the second air inlet temperature; and send the first control signal and the second control signal for adjusting the first flow control component and the second flow control component to allocate a greater portion of the heated coolant flow to a flow control component having a lower air inlet temperature.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

Figure 1:
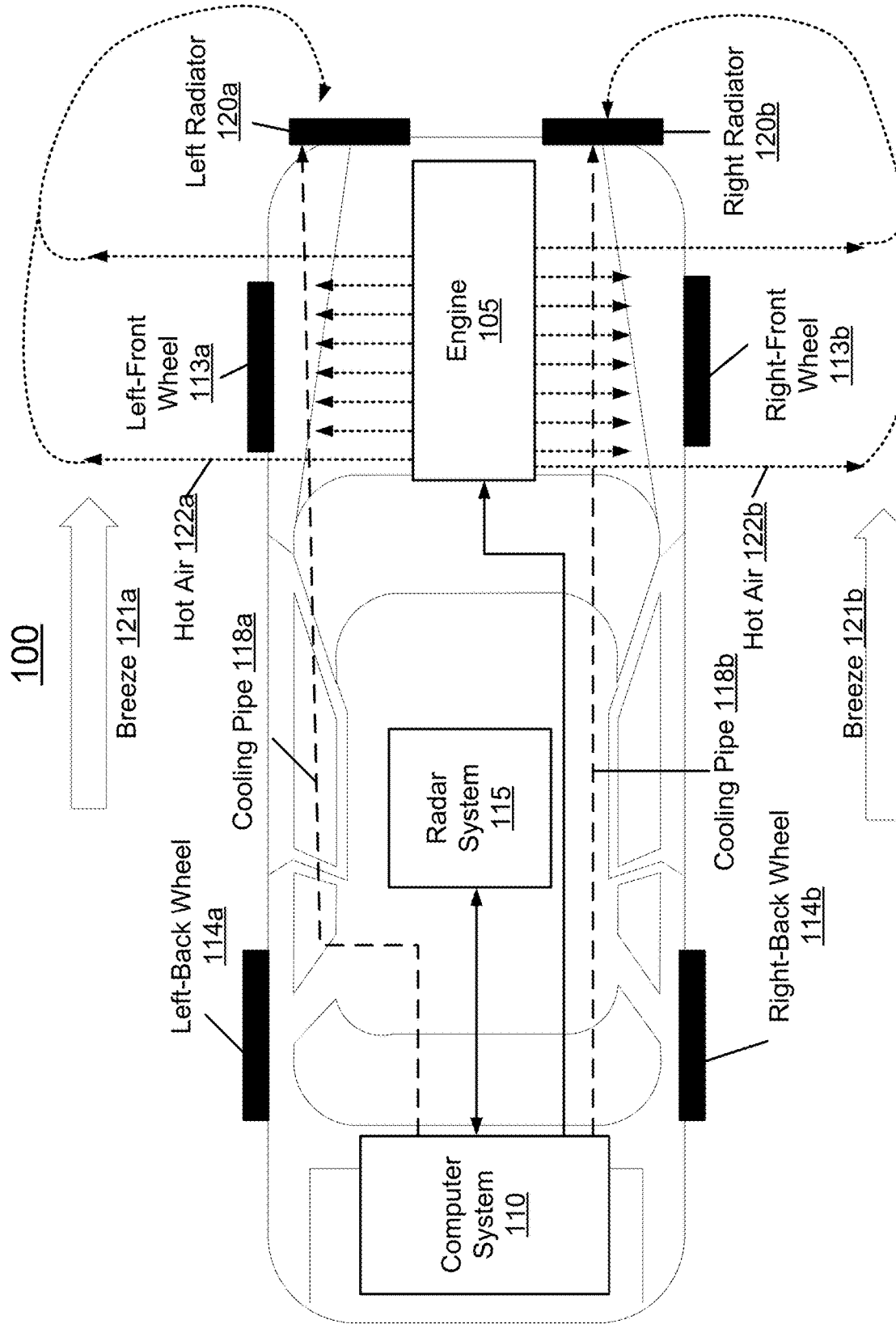
FIG. 1 is a block diagram illustrating an example structure of a cooling system equipped with a vehicle, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. The vehicle may also be equipped with a computing system that processes various types of measurement data to make control decisions of the vehicle.

On one hand, the high level of processing capacity of the computing system may generate a considerable amount of heat that drives up the internal temperature of the vehicle, thus requiring a more efficient cooling mechanism to maintain the operating temperature of mechanical and/or electrical components within the vehicle, e.g., sometimes using a larger volume or flow of cooling fluid. On the other hand, the high-power computing system itself may often takes up a significant physical space within the vehicle, leaving little room for an upgrade of the size of cooling fluid tank or pipes. In addition, the weight of the vehicle is usually constrained, rendering additional cooling components (e.g., a large de-gas tank) difficult to implement.

In view of the cooling issues in a vehicle equipped with high-power computing systems, embodiments described herein provide various mechanisms to improve the cooling system efficiency in a vehicle without additional significant physical space demands.

For example, in one embodiment, a cooling component including an underbody wheel well fan may be installed in proximity to the wheel well at each side of the front wheels. In this way, hot air released from the engine (underhood) compartment is prevented from being brought to the low-temperature radiator fan at the front side of the vehicle, as further discussed in FIGS. 1-5B.

For another example, in one embodiment, a flow control mechanism is adopted to regulate coolant flows from a computing system of the vehicle to the low-temperature radiators that can be used to release heat from heated coolant from the computing system to the outer air is adopted. The flow control mechanism is configured to control the portion of heated coolant flow to a respective radiator based on the actual air inlet temperature of the respective radiator. The radiator that has a lower air inlet temperature, e.g., lower than a threshold temperature, may be prioritized to be allocated with a larger portion of the flow for faster and efficient cooling, as further described in relation to FIGS. 6-7.

For another example, in one embodiment, a secondary filling reservoir may be added to the cooling system in addition to a de-gas tank to remove air pockets and prime the pump. The secondary filling reservoir may be filled with liquid coolant to provide additional force for priming the pump, but is placed separately at a lower level than the de-gas tank and very close to the pump, which improves space utilization by not taking up additional space at the height level of the de-gas tank where space can be highly limited. In this way, the secondary filling reservoir may provide a space-efficient solution to autonomous vehicles for enhanced pump priming, as further described in relation to FIGS. 8-9.

FIG. 1 is a block diagram 100 illustrating an example structure of a cooling system equipped with a vehicle, according to an embodiment of the present technology. Diagram 100 shows a vehicle structure having a set of front wheels 114*a-b*, and a set of back wheels 113*a-b*. The vehicle may also be installed with a radar system 115 that is configured to collect measurement data of the surrounding environment that the vehicle is situated at, and a computing system 110 that is configured to process the measurement data and make navigation control decisions. In some embodiments, the computing system 110 may be physically installed at the back of the vehicle and may take up a significant physical space.

For the computing system 110 to be operated at an operating temperature, a cooling system is used within the vehicle. The cooling system may include pipes, e.g., 118a-b, that are configured to circulate liquid coolant around the heated parts of the vehicle, such as the computing system 110, etc., such that the liquid coolant may absorb the heat and cool down the vehicle components. The heated coolant is then circulated through cooling pipes 118a-b to the low-temperature radiator panels 120a-b installed at the front side of the vehicle. The vehicle is installed with a left radiator panel 120a at the left front side, and a right radiator panel 120b at the right front side, which are used to transfer the heat from inside (e.g., coolant heated by the computing system 110, and/or other components) to the air outside. After the coolant is cooled down again at the radiators 120a-b, the cold coolant is then circulated back to the vehicle components for cooling, e.g., the computing system 110, etc.

In some embodiment, the radiators 120a-b are dedicated for heated coolant circulated for the computing system 110. The vehicle may include another radiator (not shown), e.g., installed at the middle of the front side of the vehicle, which is used to cool the heated coolant from the engine 105 and circulate the cooled coolant back to the engine 105.

Diagram 100 further depicts a scenario when the low-temperature radiators 120a-b for cooling the heated coolant circulated from the computing system 110 may be disturbed by additional hot air released by the engine 105. The engine 105, e.g., the underhood compartment, which is usually installed at the front portion of the vehicle, often releases hot air 122a-b that is pushed through the wheel wells of the front wheels 113a-b. When the vehicle is in an idle condition, the hot air 122a-b may be brought to the front side of the vehicle, e.g., near the side radiators 120a-b, by a breeze 121a-b blowing in the direction from the back to the front of the vehicle. Thus, the low temperature radiator fans of the radiators 120a-b may then suck the hot air 122a-b back into the vehicle, which disturbs or otherwise adversely affects the cooling performance and efficiency for the computing system 110.

Figure 2:
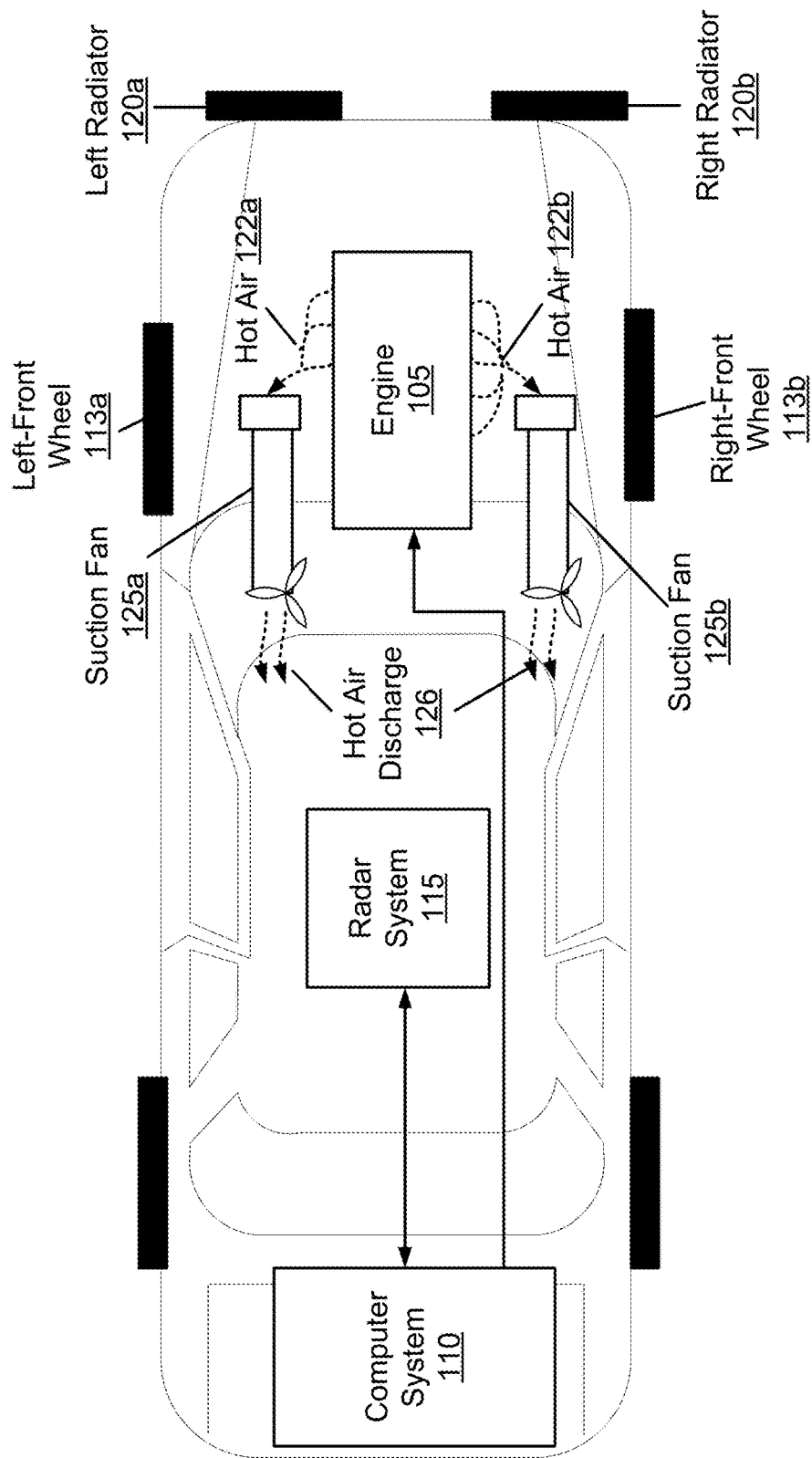
FIG. 2 is a block diagram illustrating an example structure of a cooling system with suction fans installed in proximity to the front wheel wells, according to an embodiment described herein.

FIG. 2 is a block diagram 200 illustrating an example structure of a cooling system with suction fans installed in proximity to the front wheel wells, according to an embodiment described herein. In view of the scenario when the hot air released by the engine (underhood) compartment 105 disturbs the cooling process at radiators 120a-b described in relation to FIG. 1, a pair of (or at least one) suction fans 125a-b may be installed by each side of the engine (underhood) compartment 105. Specifically, the suction fans 125a-b may be attached at the bottom of the vehicle, and are positioned at an angle to suck in the hot air 122a-b coming from the engine (underhood) compartment 105 before the hot air 122a-b is released to the wheel wells of the front wheels 113a-b.

The hot air, once sucked into the suction fans 125a-b, is then released through the other end of the suction fans 125a-b. In one embodiment, the suction fans 125a-b may be positioned at an angle such that the other ends of the suction fans 125a-b are pointing to the back of the vehicle. In this way, the hot air 126 is discharged towards the back of the vehicle, instead of being pushed to the side of the vehicle through the front wheel wells, preventing any side breeze from bringing the hot air discharge 126 to the radiators 120a-b at the front side of the vehicle.

Figure 3A:
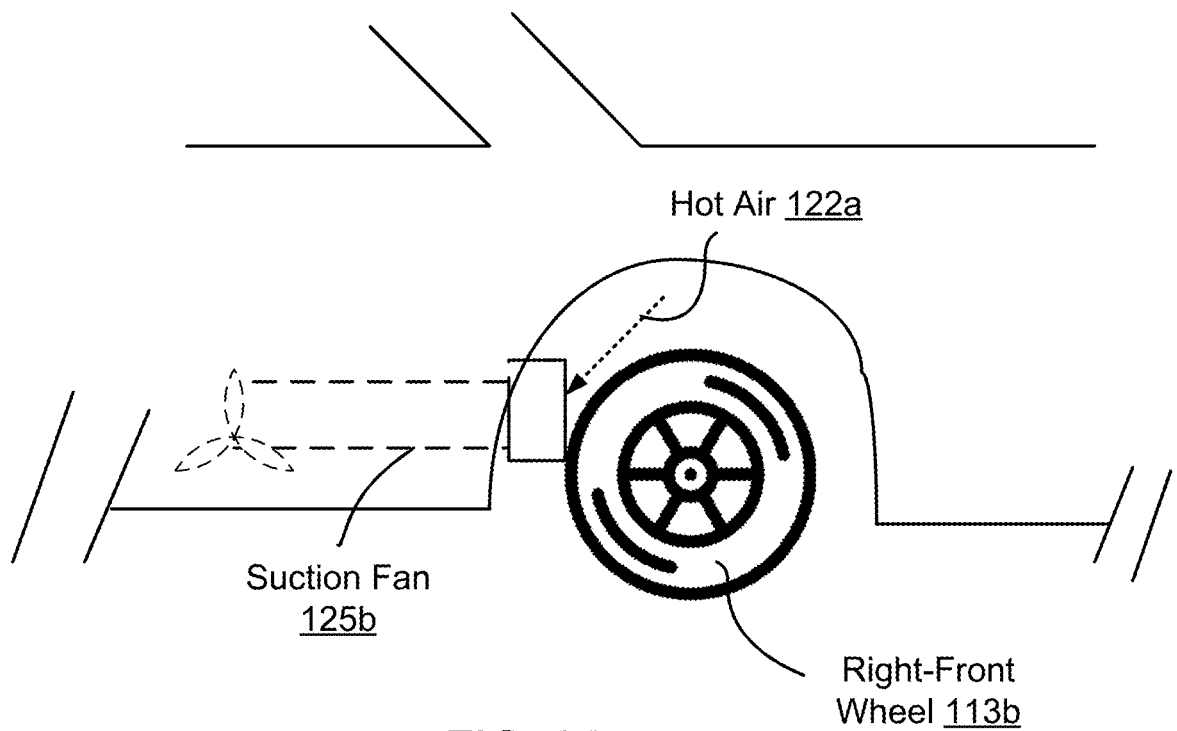
FIG. 3A is a block diagram illustrating a side view of a suction fan installed close to a front wheel well of the vehicle shown in FIG. 2, according to an embodiment described herein.

FIG. 3A is a block diagram illustrating a side view of a suction fan 125b installed close to a front wheel well of the vehicle shown in FIG. 2, according to an embodiment described herein. As shown in FIG. 3A from the side of a vehicle, the suction fan 125b may be attached at the bottom of the vehicle between the wheel well of the front wheel 113b and the engine (underhood) compartment 105 (shown in FIG. 2). Specifically, the suction end of the suction fan 125b is placed at a position to "block" the hot air 122a released from the engine (underhood) compartment as the hot air 122a approaches the wheel well. In this way, the hot air 122a may be sucked into the suction fan 125b before it is pushed through the wheel well to the side of the vehicle.

Figure 3B:
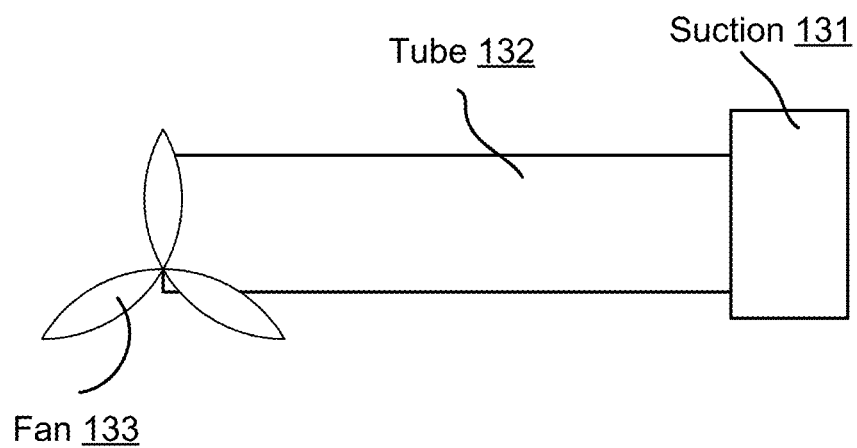
FIG. 3B is a block diagram illustrating an enlarged view of components of the suction fan shown in FIG. 3A, according to an embodiment described herein.

FIG. 3B is a block diagram illustrating an enlarged view of components of the suction fan shown in FIG. 3A, according to an embodiment described herein. Each suction fan 125a-b includes a suction component 131, a tube component 132 and a fan component 133. The suction component 131 is placed between the wheel well of the front wheel 113b and the engine (underhood) compartment 105 as shown in FIG. 3A. In this way, when the fan component 133 is turned on, hot air released from the engine (underhood) compartment 105 can be sucked into the suction component 131 and passed through the tube component 132, and eventually be blown out of the suction fan through the fan component 133.

In one embodiment, the tube component 132 may have a length that is suitable to be equipped at the bottom of the vehicle, which does not interfere with other components of the vehicle. The tube component 132 may also be long enough to extend over the side wheel well such that hot air blown out of the fan component 133 will not come out of the wheel well to the side of the vehicle.

Figure 4:
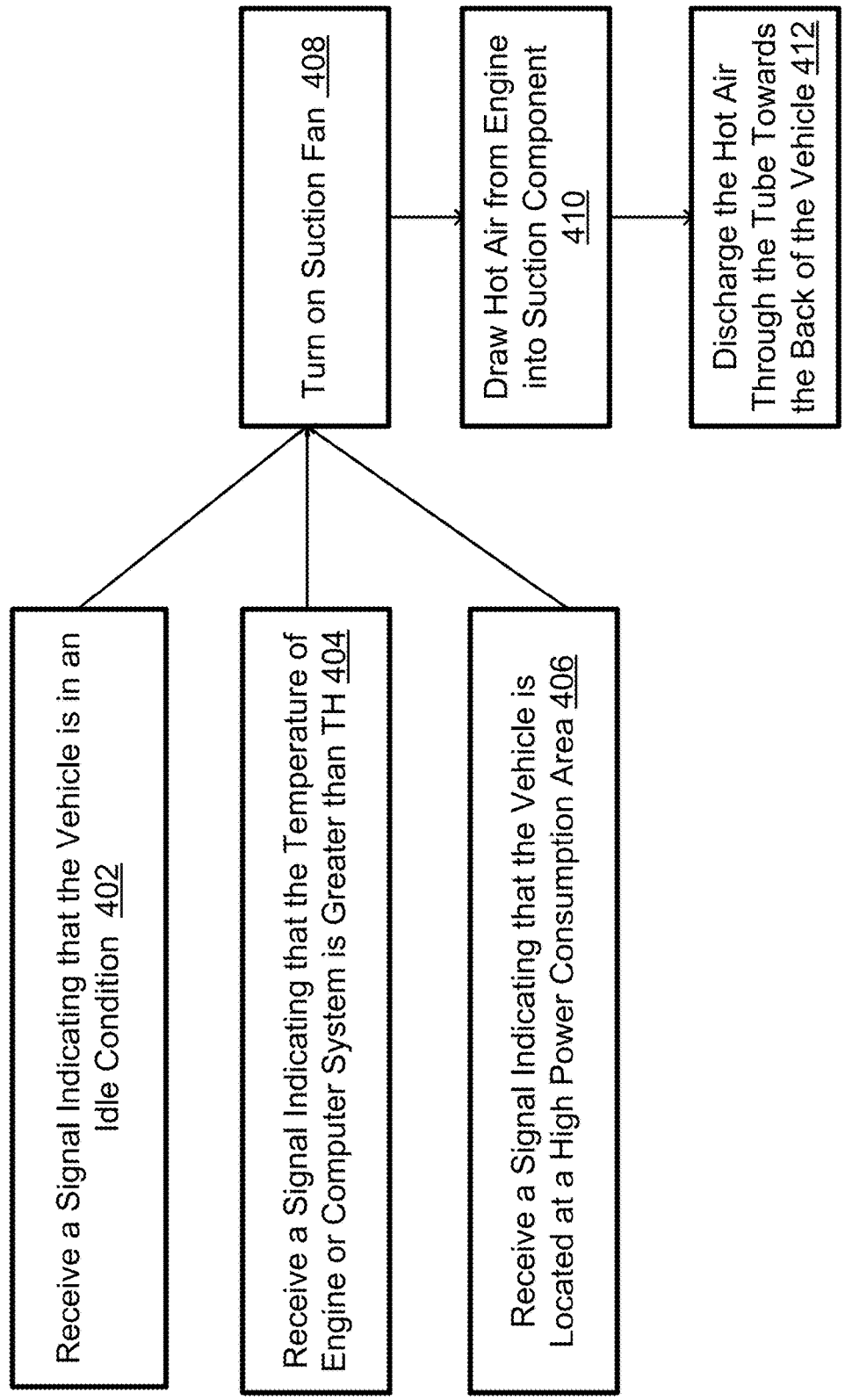
FIG. 4 is an example logic flow diagram illustrating a method performed by the cooling system shown in FIG. 2 on the vehicle to operate the suction fans to regulate the cooling process of the vehicle, according to an embodiment described herein.

FIG. 4 is an example logic flow diagram illustrating a method 400 performed by the cooling system shown in FIG. 2 on the vehicle to operate the suction fans 125a-b to regulate the cooling process of the vehicle, according to an embodiment described herein.

In one embodiment, at step 402, the suction fan may be automatically turned on when a signal indicates that the vehicle is in an idle condition. As discussed in relation to FIG. 1, when the vehicle is in the idle condition, the hot air released through the wheel wells is more likely to be brought to the front of the vehicle by breezes going from the back to the front.

In one embodiment, at step 404, the suction fan may be automatically turned on when a signal indicating that the temperature of the engine or the computer system is greater than a threshold is received. For example, the suction fan may be triggered (on or off) when a temperature threshold is met, based on the operating characteristics of the cooling component/fan and/or the desired operating temperatures of the computing system (e.g., 110 in FIG. 2) or engine (underhood) compartment (e.g., 105 in FIG. 2).

In one embodiment, at step 406, the suction fan may be automatically turned on when a signal, e.g., from a GPS on the vehicle, indicates that the vehicle is located at a high-power consumption area, e.g., downtown area with heavy traffic having lots of stops and starts, steep inclines, etc. The suction fan may also be turned on for a current need or an anticipated future need. For instance, when the computing system of the vehicle determines that the vehicle is proceeding from a rural area to a densely populated area, and anticipates heavier processing tasks, the suction fan may be turned on to prepare for anticipated higher amounts of energy consumption.

Continuing on with step 408, the suction fan is turned on. At step 410, hot air (e.g., 122*a-b* in FIG. 2) dissipated from the engine (underhood) compartment may then be drawn into the suction component placed in proximity to the engine (underhood) compartment.

At step 412, the hot air passes through the tube component of the suction fan and is discharged towards the back of the vehicle.

Figure 5A:
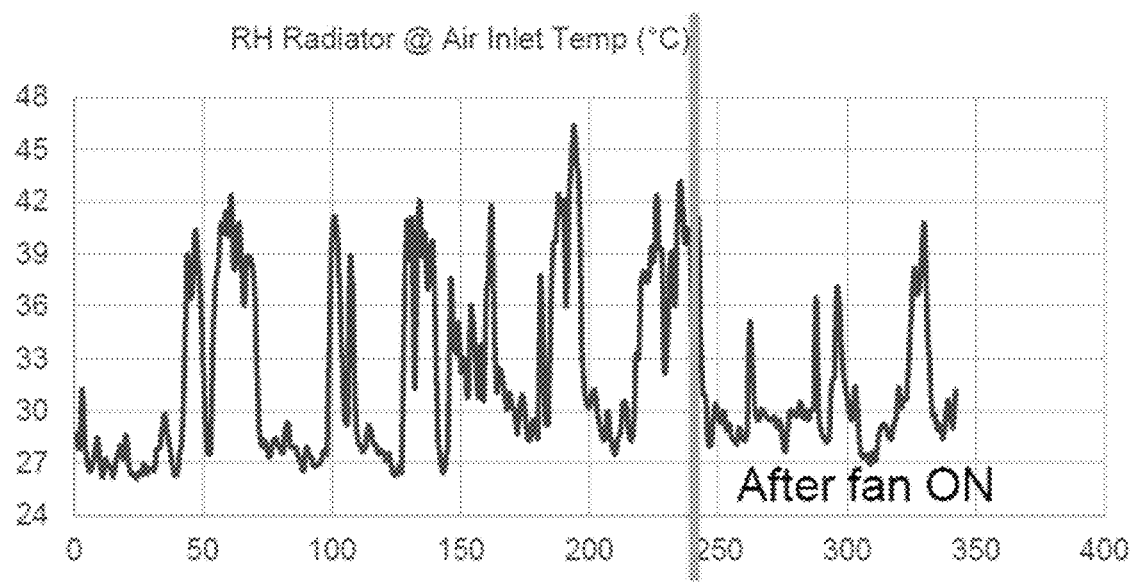
FIGS. 5A-5B are example diagrams illustrating performance of the cooling system shown in FIG. 2, according to an embodiment described herein.
Figure 5B:
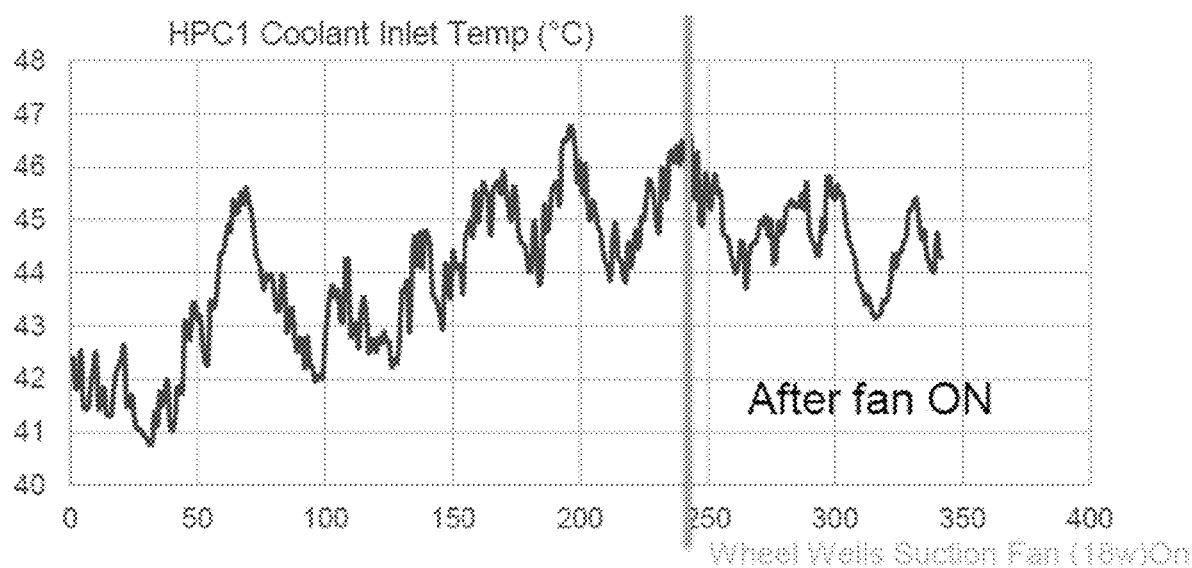

FIGS. 5A-5B are example diagrams illustrating performance of the cooling system shown in FIG. 2, according to an embodiment described herein. In FIG. 5A, the average temperature of the air inlet of the radiator has decreased significantly after the suction fan has been turned on. In FIG. 5B, the average temperature of the coolant inlet has decreased, e.g., for more than one degree, after the suction fan has been turned on.

Figure 6:
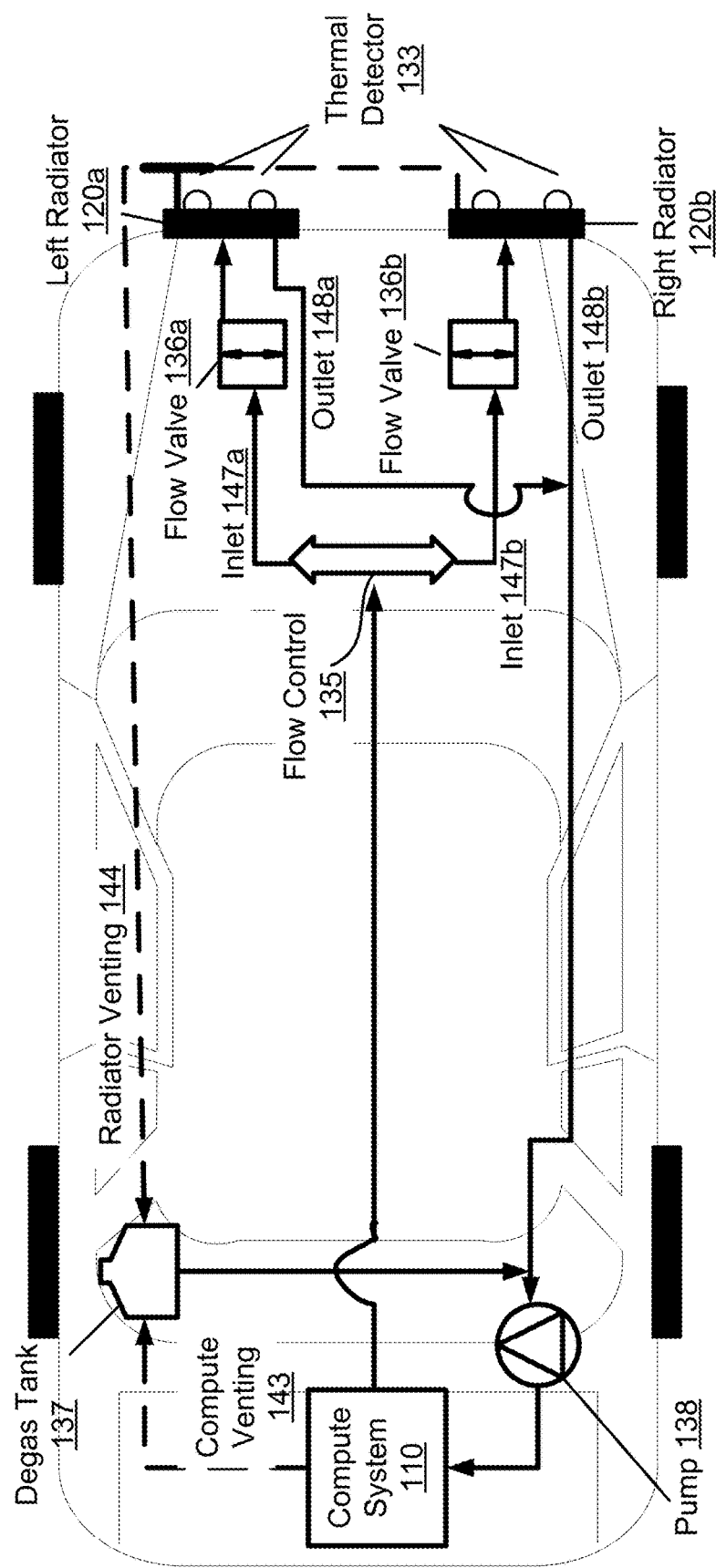
FIG. 6 is a block diagram of an example structure illustrating a flow control mechanism of a cooling system on a vehicle, according to an embodiment described herein.

FIG. 6 is a block diagram 600 of an example structure illustrating a flow control mechanism of a cooling system on a vehicle, according to an embodiment described herein. Diagram 600 shows a vehicle structure similar to those shown in FIGS. 1-2. Specifically, the vehicle is installed with a cooling system that includes a de-gas tank 137 filled with coolant, which is connected to a pump 138 configured to draw the coolant from the de-gas tank 137 into a circulated cooling system for the computing system 110. In one embodiment, the degas tank 137 may be connected to the vent 143 from the computing system 110, and also connected to the radiator venting 144 from the radiators 120*a-b*. The coolant may be pumped from the pump 138 to absorb heat generated from the computing system 110, and the heated coolant is passed, via the flow control mechanism 135, to the radiators 120*a-b* at the front side of the vehicle.

A flow control mechanism 135 may be installed, which sends the heated coolant from the computing system 110, via the inlet paths 147*a-b*, to the radiators 120*a-b*. A set of flow valves 136*a-b* may be installed to allow or prevent passage of coolant flow to the radiators 120*a-b*, respectively. At the radiators 120*a-b*, the heated coolant may be cooled down, and the cooled coolant liquid may be circulated back, via the outlet paths 148*a-b*, to the pump 138.

The flow control mechanism 135, together with algorithms running with the computing system 110, may control the portion of heated coolant flow to a respective radiator, e.g., the left radiator 120*a* or the right radiator 120*b*, based on the actual air inlet temperature of the respective radiator. For example, each of the flow valves 136*a-b* may be open, partially open/closed, or closed to control the portion of coolant flow that is passed to a respective radiator 120*a-b*.

Specifically, a set of thermometers 133 may be installed at each of the side radiators 120*a-b*, from which an average temperature of the air inlet of each side radiator can be obtained. In some embodiments, at each radiator 120*a-b*, a set of thermometers may be placed at different positions on the radiator in order to sample the temperature at different positions for computing an average temperature representing the air inlet temperature of the radiator. The radiator having a lower average temperature may be allocated with a larger portion of the flow for faster and efficient cooling. In this way, cooling system efficiency may be improved by taking advantage of the cooling capacity of the radiator with a lower temperature, and also balancing the temperatures of the two radiators.

Figure 7:
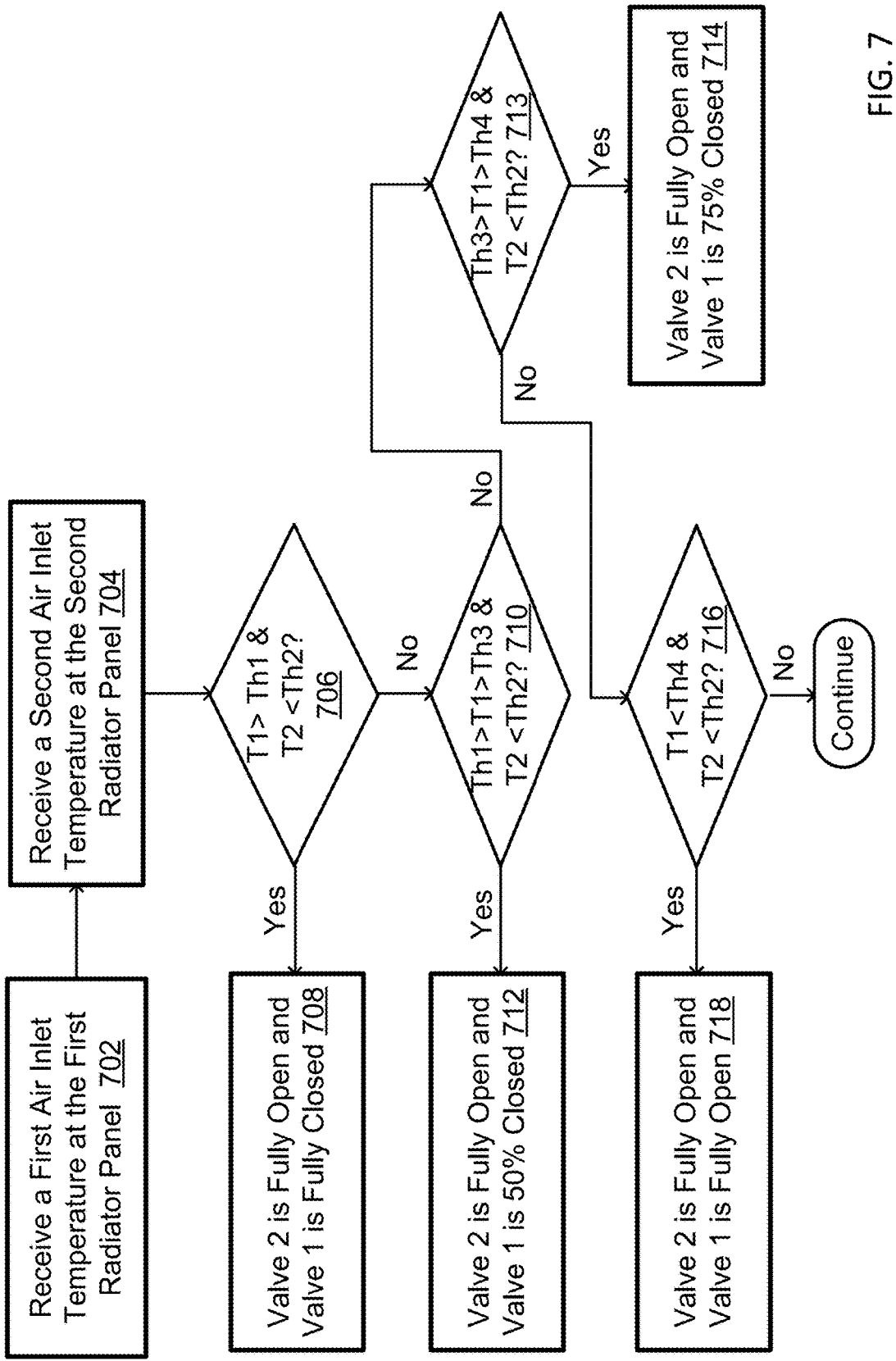
FIG. 7 is an example logic flow diagram illustrating a method performed by the cooling system shown in FIG. 6 to operate a flow control process for allocating coolant flows to radiators on different sides of the vehicle, according to an embodiment described herein.

FIG. 7 is an example logic flow diagram illustrating a method 700 performed by the cooling system shown in FIG. 6 to operate a flow control process for allocating coolant flows to radiators on different sides of the vehicle, according to an embodiment described herein.

At step 702, the first air inlet temperature T1 at the first radiator panel may be received. For example, the one or more thermal detectors 133 installed at the left radiator 120*a* may send signals indicating temperature measurement data to the computing system on the vehicle, which may in turn compute the temperature T1 representing the air inlet temperature of the radiator 120*a* by taking an average of the sensed temperature measurement data.

At step 704, the second air inlet temperature T2 at the second radiator panel 120*b* may be received, e.g., in a similar way as step 702.

At step 706, the flow control mechanism may compare T1 and T2 against a set of pre-determined temperature thresholds, e.g., Th1=60° C. and Th2=50° C., etc. When T1≥Th1 and T2≤Th2 at step 706, method 700 proceeds to step 708, at which the flow control mechanism fully opens the flow valve 136*b* (referred to as "Valve 2" in FIG. 7) and fully closes the flow valve 136*a* (referred to as "Valve 1" in FIG. 7) to take advantage of the low temperature of radiator 120*b* by sending the heated coolant flow to the radiator 120*b*.

Otherwise, at step 710, if Th1>T1≥Th3 (e.g., Th3=58° C.) and T2≤Th2, method 700 proceeds to step 712, at which the flow control mechanism fully opens flow valve 136*b* and partially closes flow valve 136*a* (e.g., 50% closed). The rationale may be that when the average air inlet temperature of radiator 120*a* decrease, part of the coolant flow may be allocated to the radiator 120*a*.

Otherwise, method 700 proceeds to step 713. At step 713, if Th3>T1≥Th4 (e.g., Th4=55° C.) and T2≤Th2, method 700 proceeds to step 714, at which the flow control mechanism fully opens valve 136*b* and partially closes flow valve 136*a* to a lesser degree than that at step 712 (e.g., 75% open).

Otherwise, method 700 proceeds to step 716 from step 713. At step 716, if T1<Th4 and T2≤Th2, method 700 proceeds to step 718, at which the flow control mechanism fully opens flow valve 136*b* and fully opens flow valve 136*a*.

Method 700 may continue monitoring the air inlet temperatures of radiators 120*a-b* to repeat steps 702-718.

Within embodiments, the example threshold temperatures described in relation to FIG. 7 are for illustrative purpose only, and any other example threshold temperatures may be adopted. In some embodiments, the example threshold temperatures may be determined statistically based on cooling performance feedback of the vehicle.

Figure 8:
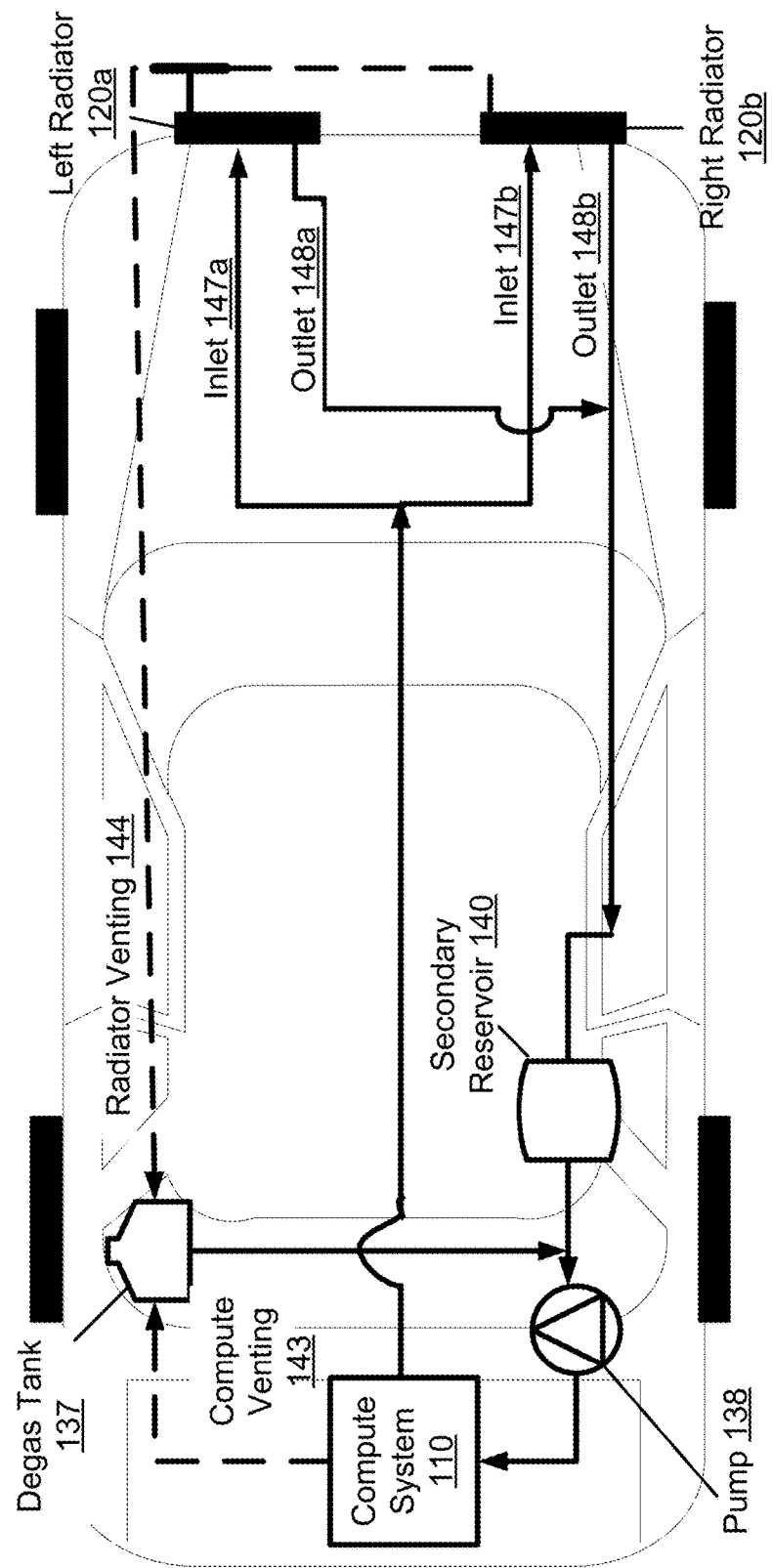
FIG. 8 is a block diagram of an example structure illustrating a de-gas mechanism having a secondary reservoir for priming a pump of a cooling system on a vehicle, according to an embodiment described herein.

FIG. 8 is a block diagram of an example structure illustrating a de-gas mechanism having a secondary reservoir for priming a pump of a cooling system on a vehicle, according to an embodiment described herein. Diagram 800 shows a vehicle structure having a cooling system with similar components as the vehicle structure shown in FIGS. 2 and 6. For example, the vehicle may be installed with a cooling system that uses a pump 138 to circulate a coolant flow inside the vehicle to bring away the heat from various parts of the vehicle, e.g., engine (underhood) compartment 105, computing system 110, etc. The cooling system often includes a de-gas tank 137 that acts as a reservoir of the coolant and also removes the entrapped gases/air from the cooling system. For example, the de-gas tank 137 may be a 1 L Chevy Spark degas tank. For another example, the de-gas tank 137 may contain 20-30% of the system capacity of coolant volume—but with a secondary filling reservoir 140, the volume of the de-gas tank 137 may be reduced to 8-10% of the total system capacity of coolant volume without affecting the cooling performance. In this way, space at a higher level (e.g., close to the ceiling of the vehicle inside the vehicle chamber) can be saved and/or used more efficiently.

Specifically, the net positive suction head required (NPSHR) is the pressure or energy required for the coolant in the pump 138 to overcome the friction loss from the suction nozzle to the eye of the impeller of the pump without causing vaporization. When the NPSHR is greater than the net positive suction available at the pump 138, the liquid coolant may vaporize, causing vapor bubbles to collapse (implode) as the bubbles encounter increased pressure when exiting from the impeller, which leads to pump cavitation.

To remove the air bubbles trapped in the pump 138 or elsewhere within the cooling system, the gravity of the coolant inside the de-gas tank 137 can be used to prime a pump to circulate coolant flow in the cooling system. Thus, a larger de-gas tank containing a larger volume of coolant is usually desirable to generate a more powerful force to prime the pump. However, as the physical space inside the vehicle is highly limited and the weight of the vehicle is constrained, a de-gas tank with a large volume is often difficult to fit into the vehicle compartment.

In view of the need for a space-efficient solution to enhance power capacity of the de-gas system, a secondary filling reservoir 140 that is separate from the de-gas tank 137 may be placed in proximity to the pump 138 to fill the pump suction side. For example, the degas tank 137 may be placed at a relatively higher level, e.g., e.g., closer to the ceiling of the chamber of the vehicle, such that the gravity of the coolant inside the de-gas tank may provide a force to prime a pump. The pump 138 is placed at a relatively lower level, while the secondary reservoir 140 is placed at the same level with and right next to the pump 138. Specifically, the secondary filling reservoir 137 may be filled with coolant and is placed next to the pump 138 such that the secondary filling reservoir 140 provides additional coolant filling, together with coolant filling from the de-gas tank 137, at the pump location to remove air pockets by filling the pump with the coolant, and to prime the pump 138. Specifically, the secondary filling reservoir 137, together with the coolant, is configured to create a net positive head at the pump inlet of the pump 138 to overcome the friction loss from the suction nozzle to the eye of the impeller of the pump. Once the pump 138 is primed, the secondary reservoir 140 may be completely filled and closed, until being turned on again for the next priming. In this way, the secondary filling reservoir 140 provides additional force to fill the pump 138 but does not require additional spatial space at the height of the de-gas tank 137.

In some embodiments, the de-gas tank 137 may have a vent (e.g., for the compute venting 143 and radiator venting 144), while the secondary filling reservoir 140 may not have any vent functionality. In this way, the secondary filling reservoir 140 may ensure that the cooling liquid is at the pump inlet of pump 138 when it is time to prime the pump.

Figure 9:
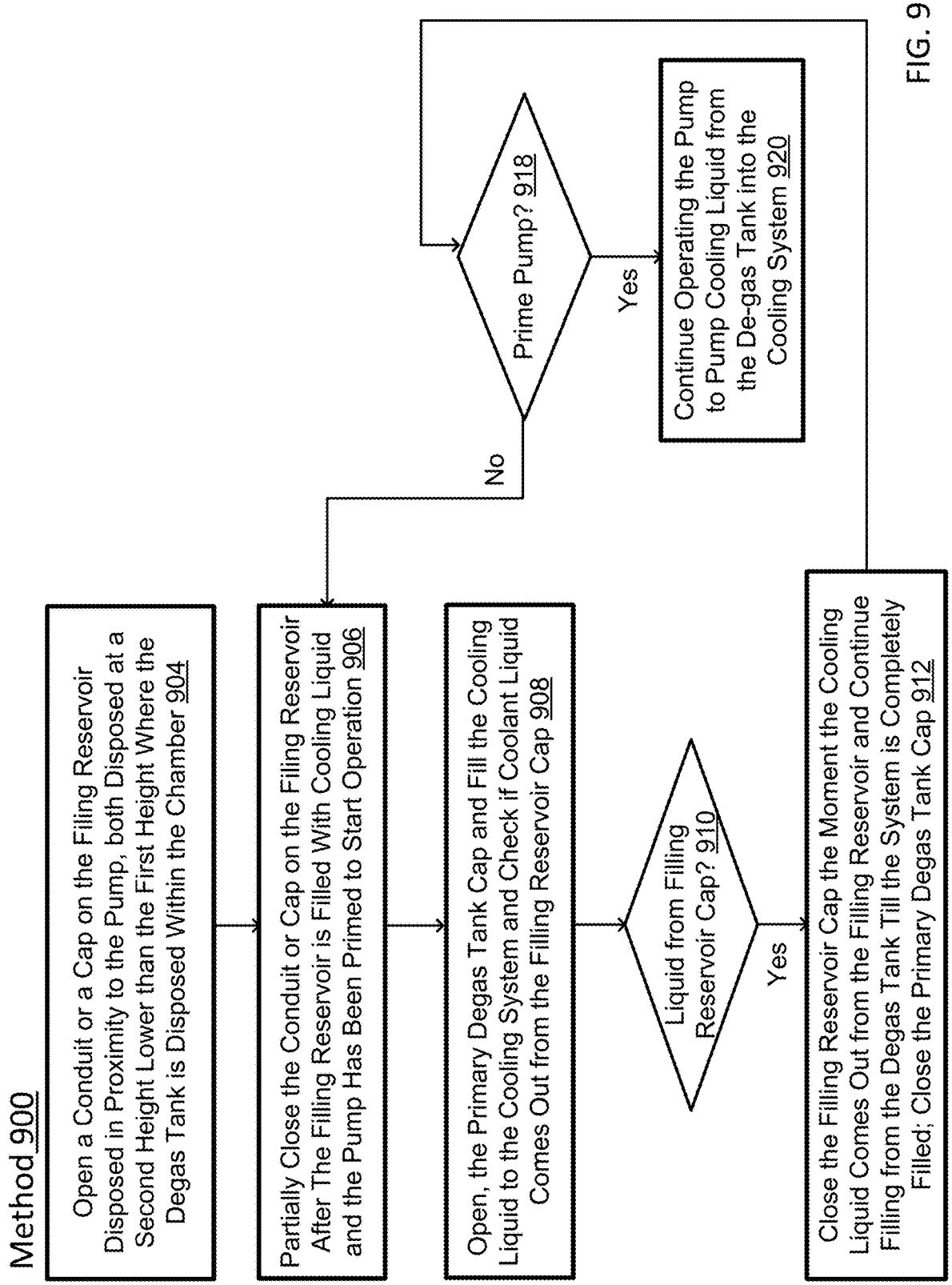
FIG. 9 is an example logic flow diagram illustrating a method performed by the cooling system shown in FIG. 8 to prime the pump and initialize the cooling system with the secondary reservoir, according to an embodiment described herein.

FIG. 9 is an example logic flow diagram illustrating a method 900 performed by the cooling system shown in FIG. 8 to prime the pump 138 and initialize the cooling system with the secondary reservoir 140, according to an embodiment described herein.

At step 904, a conduit or a cap on the filing reservoir (e.g., 140 in FIG. 8) that is disposed in proximity to the pump 138 is opened such that coolant inside the filling reservoir may be pushed into the pump. Both the pump and the filling reservoir may be disposed at a second height lower than the first height within the chamber, e.g., both at a lower level than the de-gas tank so as not to take up spatial space closer to the ceiling of the chamber of the vehicle.

At step 906, the conduit or the cap on the filling reservoir is partially closed after the filling reservoir is filled with cooling liquid and the pump has been primed to start operation.

At step 908, the primary de-gas tank cap is opened to fill the cooling liquid to the cooling system. At this time, it may be checked that if the cooling liquid comes out from the filling reservoir cap.

At step 910, if there is cooling liquid coming out of the filling reservoir cap when the primary de-gas tank cap is opened, method 900 proceeds to step 912. At step 912, the filling reservoir cap is closed at the moment when the cooling liquid comes out from the filling reservoir. The de-gas tank continues to fill the cooling system with cooling liquid till the system is completely filled. Then the primary degas tank cap may be closed.

At step 918, it is determined whether the pump is to be primed again. If no further priming is needed, method 900 continue with step 906, at which the filling reservoir cap is fully closed after the filling reservoir is filled with cooling liquid. If the pump is primed the pump continues to be operated to pump cooling liquid into the cooling system at step 920, with continuous de-aeration of the cooling system.

Figure 10:
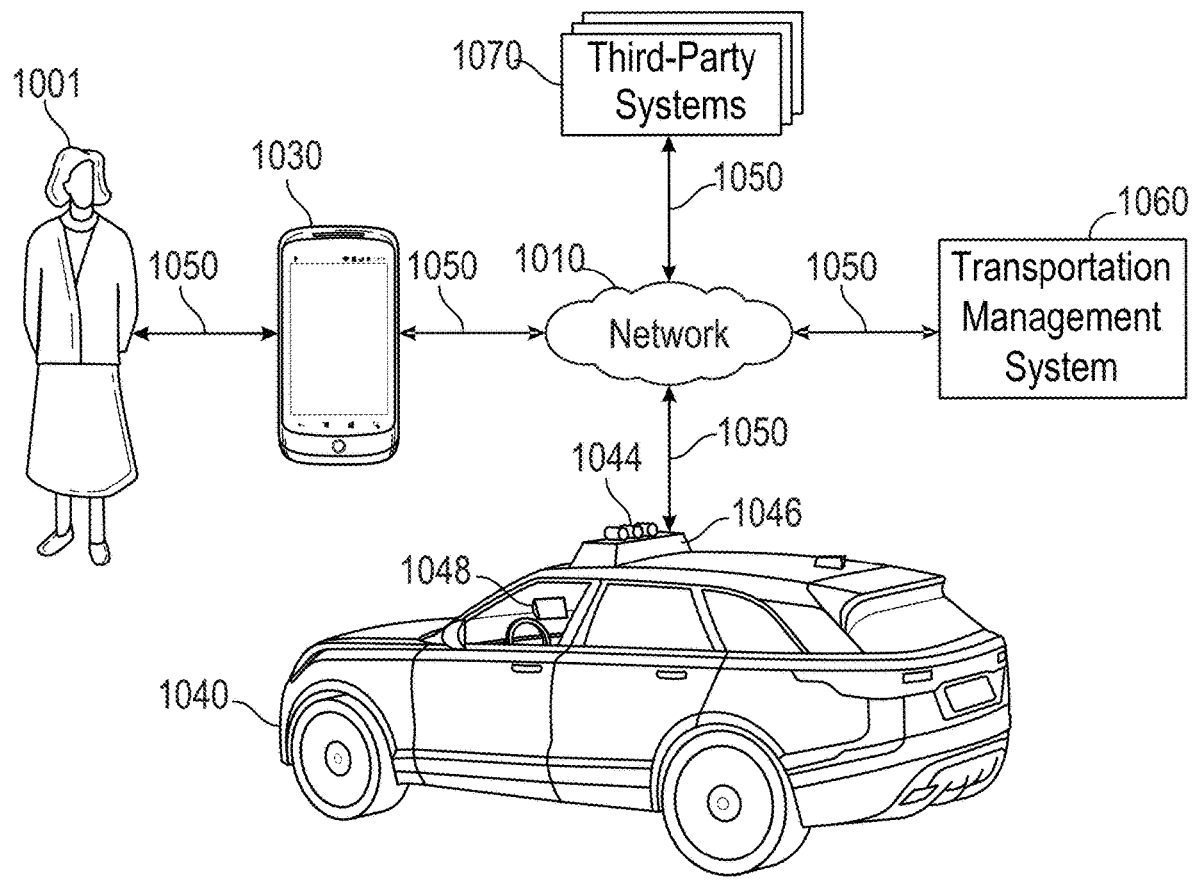
FIG. 10 illustrates an example block diagram of a transportation management environment for a vehicle equipped with any cooling components or processes described in FIGS. 1-9, according to an embodiment of the present technology.

FIG. 10 illustrates an example block diagram of a transportation management environment for matching ride requestors with vehicles, where the vehicles can use the various embodiments of enhanced cooling systems as described in FIGS. 2-9. In particular embodiments, the environment may include various computing entities, such as a user computing device 1030 of a user 1001 (e.g., a ride provider or requestor), a transportation management system 1060, a vehicle 1040, and one or more third-party systems 1070. The vehicle 1040 can be autonomous, semi-autonomous, or manually drivable. The computing entities may be communicatively connected over any suitable network 1010. As an example and not by way of limitation, one or more portions of network 1010 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 10 illustrates a single user device 1030, a single transportation management system 1060, a single vehicle 1040, a plurality of third-party systems 1070, and a single network 1010, this disclosure contemplates any suitable number of each of these entities. As an example and not by way of limitation, the network environment may include multiple users 1001, user devices 1030, transportation management systems 1060, vehicles 1040, third-party systems 1070, and networks 1010. In some embodiments, some or all of the blocks or modules shown in FIGS. 2-9 may be implemented by one or more computing systems of the transportation management system 1060. In some embodiments, some or all of the blocks or modules shown in FIGS. 2-9 may be implemented by one or more computing systems in the vehicle 1040.

The user device 1030, transportation management system 1060, vehicle 1040, and third-party system 1070 may be communicatively connected or co-located with each other in whole or in part. These computing entities may communicate via different transmission technologies and network types. For example, the user device 1030 and the vehicle 1040 may communicate with each other via a cable or short-range wireless communication (e.g., Bluetooth, NFC, WI-FI, etc.), and together they may be connected to the Internet via a cellular network that is accessible to either one of the devices (e.g., the user device 1030 may be a smartphone with LTE connection). The transportation management system 1060 and third-party system 1070, on the other hand, may be connected to the Internet via their respective LAN/WLAN networks and Internet Service Providers (ISP). FIG. 10 illustrates transmission links 1050 that connect user device 1030, vehicle 1040, transportation management system 1060, and third-party system 1070 to communication network 1010. This disclosure contemplates any suitable transmission links 1050, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 1050 may connect to one or more networks 1010, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 1050. For example, the user device 1030 may communicate with the transportation management system via a cellular network and the Internet, but communicate with the vehicle 1040 via Bluetooth or a physical wire connection.

In particular embodiments, the transportation management system 1060 may fulfill ride requests for one or more users 1001 by dispatching suitable vehicles. The transportation management system 1060 may receive any number of ride requests from any number of ride requestors 1001. In particular embodiments, a ride request from a ride requestor 1001 may include an identifier that identifies the ride requestor in the system 1060. The transportation management system 1060 may use the identifier to access and store the ride requestor's 1001 information, in accordance with the requestor's 1001 privacy settings. The ride requestor's 1001 information may be stored in one or more data stores (e.g., a relational database system) associated with and accessible to the transportation management system 1060. In particular embodiments, ride requestor information may include profile information about a particular ride requestor 1001. In particular embodiments, the ride requestor 1001 may be associated with one or more categories or types, through which the ride requestor 1001 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 1060 may classify a user 1001 based on known information about the user 1001 (e.g., using machine-learning classifiers), and use the classification to retrieve relevant aggregate information associated with that class. For example, the system 1060 may classify a user 1001 as a young adult and retrieve relevant aggregate information associated with young adults, such as the type of music generally preferred by young adults.

Transportation management system 1060 may also store and access ride information. Ride information may include locations related to the ride, traffic data, route options, optimal pick-up or drop-off locations for the ride, or any other suitable information associated with a ride. As an example and not by way of limitation, when the transportation management system 1060 receives a request to travel from San Francisco International Airport (SFO) to Palo Alto, Calif., the system 1060 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 1060. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 1060. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 1060 in particular embodiments may predict and provide ride suggestions in response to a ride request. In particular embodiments, the system 1060 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 1060 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 1060 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 1030 (which may belong to a ride requestor or provider), a transportation management system 1060, vehicle system 1040, or a third-party system 1070 to process, transform, manage, retrieve, modify, add, or delete the information stored in the data store.

In particular embodiments, transportation management system 1060 may include an authorization server (or any other suitable component(s)) that allows users 1001 to opt-in to or opt-out of having their information and actions logged, recorded, or sensed by transportation management system 1060 or shared with other systems (e.g., third-party systems 1070). In particular embodiments, a user 1001 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 1001 of transportation management system 1060 through blocking, data hashing, anonymization, or other suitable techniques as appropriate.

In particular embodiments, third-party system 1070 may be a network-addressable computing system that may provide HD maps or host GPS maps, customer reviews, music or content, weather information, or any other suitable type of information. Third-party system 1070 may generate, store, receive, and send relevant data, such as, for example, map data, customer review data from a customer review website, weather data, or any other suitable type of data. Third-party system 1070 may be accessed by the other computing entities of the network environment either directly or via network 1010. For example, user device 1030 may access the third-party system 1070 via network 1010, or via transportation management system 1060. In the latter case, if credentials are required to access the third-party system 1070, the user 1001 may provide such information to the transportation management system 1060, which may serve as a proxy for accessing content from the third-party system 1070.

In particular embodiments, user device 1030 may be a mobile computing device such as a smartphone, tablet computer, or laptop computer. User device 1030 may include one or more processors (e.g., CPU, GPU), memory, and storage. An operating system and applications may be installed on the user device 1030, such as, e.g., a transportation application associated with the transportation management system 1060, applications associated with third-party systems 1070, and applications associated with the operating system. User device 1030 may include functionality for determining its location, direction, or orientation, based on integrated sensors such as GPS, compass, gyroscope, or accelerometer. User device 1030 may also include wireless transceivers for wireless communication and may support wireless communication protocols such as Bluetooth, near-field communication (NFC), infrared (IR) communication, WI-FI, and 2G/3G/4G/LTE/5G mobile communication standard. User device 1030 may also include one or more cameras, scanners, touchscreens, microphones, speakers, and any other suitable input-output devices.

In particular embodiments, the vehicle 1040 may be equipped with an array of sensors 1044, a navigation system 1046, and a ride-service computing device 1048. In particular embodiments, a fleet of vehicles 1040 may be managed by the transportation management system 1060. The fleet of vehicles 1040, in whole or in part, may be owned by the entity associated with the transportation management system 1060, or they may be owned by a third-party entity relative to the transportation management system 1060. In either case, the transportation management system 1060 may control the operations of the vehicles 1040, including, e.g., dispatching select vehicles 1040 to fulfill ride requests, instructing the vehicles 1040 to perform select operations (e.g., head to a service center or charging/fueling station, pull over, stop immediately, self-diagnose, lock/unlock compartments, change music station, change temperature, and any other suitable operations), and instructing the vehicles 1040 to enter select operation modes (e.g., operate normally, drive at a reduced speed, drive under the command of human operators, and any other suitable operational modes).

In particular embodiments, the vehicles 1040 may receive data from and transmit data to the transportation management system 1060 and the third-party system 1070. Examples of received data may include, e.g., instructions, new software or software updates, maps, 3D models, trained or untrained machine-learning models, location information (e.g., location of the ride requestor, the vehicle 1040 itself, other vehicles 1040, and target destinations such as service centers), navigation information, traffic information, weather information, entertainment content (e.g., music, video, and news) ride requestor information, ride information, and any other suitable information. Examples of data transmitted from the vehicle 1040 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 1040, passengers may send/receive data to the transportation management system 1060 and third-party system 1070), and any other suitable data.

In particular embodiments, vehicles 1040 may also communicate with each other, including those managed and not managed by the transportation management system 1060. For example, one vehicle 1040 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 1060 or third-party system 1070), or both.

In particular embodiments, a vehicle 1040 may obtain and process sensor/telemetry data. Such data may be captured by any suitable sensors. For example, the vehicle 1040 may have a Light Detection and Ranging (LiDAR) sensor array of multiple LiDAR transceivers that are configured to rotate 360°, emitting pulsed laser light and measuring the reflected light from objects surrounding vehicle 1040. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 1040. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 1040 may have optical cameras pointing in different directions. The cameras may be used for, e.g., recognizing roads, lane markings, street signs, traffic lights, police, other vehicles, and any other visible objects of interest. To enable the vehicle 1040 to "see" at night, infrared cameras may be installed. In particular embodiments, the vehicle may be equipped with stereo vision for, e.g., spotting hazards such as pedestrians or tree branches on the road. As another example, the vehicle 1040 may have radars for, e.g., detecting other vehicles and hazards afar. Furthermore, the vehicle 1040 may have ultrasound equipment for, e.g., parking and obstacle detection. In addition to sensors enabling the vehicle 1040 to detect, measure, and understand the external world around it, the vehicle 1040 may further be equipped with sensors for detecting and self-diagnosing the vehicle's own state and condition. For example, the vehicle 1040 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 1040 may build a 3D model of its surrounding based on data from its LiDAR, radar, sonar, and cameras, along with a pre-generated map obtained from the transportation management system 1060 or the third-party system 1070. Although sensors 1044 appear in a particular location on the vehicle 1040 in FIG. 10, sensors 1044 may be located in any suitable location in or on the vehicle 1040. Example locations for sensors include the front and rear bumpers, the doors, the front windshield, on the side panel, or any other suitable location.

In particular embodiments, the vehicle 1040 may be equipped with a processing unit (e.g., one or more CPUs and GPUs), memory, and storage. The vehicle 1040 may thus be equipped to perform a variety of computational and processing tasks, including processing the sensor data, extracting useful information, and operating accordingly. For example, based on images captured by its cameras and a machine-vision model, the vehicle 1040 may identify particular types of objects captured by the images, such as pedestrians, other vehicles, lanes, curbs, and any other objects of interest.

In particular embodiments, the vehicle 1040 may have a navigation system 1046 responsible for safely navigating the vehicle 1040. In particular embodiments, the navigation system 1046 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 1046 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 1046 may use its determinations to control the vehicle 1040 to operate in prescribed manners and to guide the vehicle 1040 to its destinations without colliding into other objects. Although the physical embodiment of the navigation system 1046 (e.g., the processing unit) appears in a particular location on the vehicle 1040 in FIG. 10, navigation system 1046 may be located in any suitable location in or on the vehicle 1040. Example locations for navigation system 1046 include inside the cabin or passenger compartment of the vehicle 1040, near the engine/battery, near the front seats, rear seats, or in any other suitable location.

In particular embodiments, the vehicle 1040 may be equipped with a ride-service computing device 1048, which may be a tablet or any other suitable device installed by transportation management system 1060 to allow the user to interact with the vehicle 1040, transportation management system 1060, other users 1001, or third-party systems 1070. In particular embodiments, installation of ride-service computing device 1048 may be accomplished by placing the ride-service computing device 1048 inside the vehicle 1040, and configuring it to communicate with the vehicle 1040 via a wired or wireless connection (e.g., via Bluetooth). Although FIG. 10 illustrates a single ride-service computing device 1048 at a particular location in the vehicle 1040, the vehicle 1040 may include several ride-service computing devices 1048 in several different locations within the vehicle. As an example and not by way of limitation, the vehicle 1040 may include four ride-service computing devices 1048 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 1048 may be detachable from any component of the vehicle 1040. This may allow users to handle ride-service computing device 1048 in a manner consistent with other tablet computing devices. As an example and not by way of limitation, a user may move ride-service computing device 1048 to any location in the cabin or passenger compartment of the vehicle 1040, may hold ride-service computing device 1048, or handle ride-service computing device 1048 in any other suitable manner. Although this disclosure describes providing a particular computing device in a particular manner, this disclosure contemplates providing any suitable computing device in any suitable manner.

Figure 11:
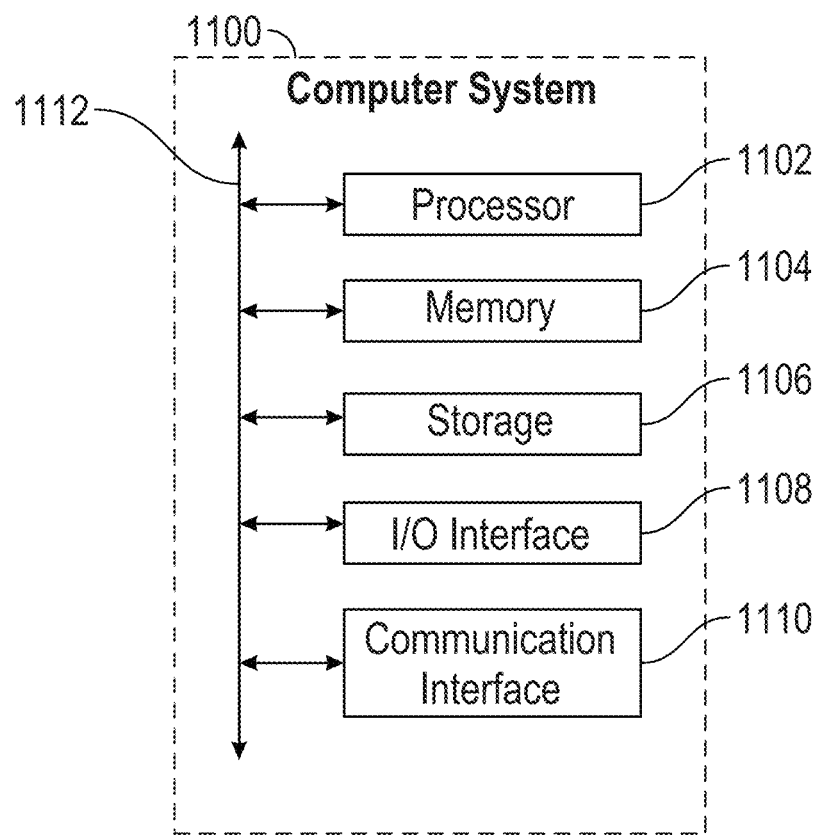
FIG. 11 illustrates an example of a computer system or computing device that can be utilized in various scenarios such as on the vehicle, according to an embodiment of the present technology.

FIG. 11 illustrates an example computer system 1100. In particular embodiments, the computer system 1100 may be similar to the computing system 110 installed on a vehicle shown in FIGS. 1-2 and 8. In particular embodiments, one or more computer systems 1100 perform one or more steps of one or more methods described or illustrated in at least FIGS. 4, 7 and 9. In particular embodiments, one or more computer systems 1100 provide the functionalities described or illustrated herein. In particular embodiments, software running on one or more computer systems 1100 performs one or more steps of one or more methods described or illustrated herein or provides the functionalities described or illustrated herein. Particular embodiments include one or more portions of one or more computer systems 1100. Herein, a reference to a computer system may encompass a computing device, and vice versa, where appropriate. Moreover, a reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 that are to be operated on by computer instructions; the results of previous instructions executed by processor 1102 that are accessible to subsequent instructions or for writing to memory 1104 or storage 1106; or any other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs), be a multi-core processor, or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described in further detail below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware or software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware or software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware or software, or both coupling components of computer system 1100 to each other. As an example and not by way of limitation, bus 1112 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An apparatus for vehicle radiator cooling control, the apparatus comprising:
    a first suction component disposed within a first proximity to a first wheel well at a first side of a vehicle that is away from a radiator of the vehicle and between the first wheel well and an engine of the vehicle, the first suction component configured to draw air released from an engine compartment of the vehicle toward a rear of the vehicle and prevent the air from escaping through the first wheel well;
    a first tube component having a first end connected to the first suction component and a second end extended to a direction away from a front side of the vehicle and toward the rear of the vehicle, the first tube component configured to pass the air from the first suction component to the second end of the first tube component;
    a first fan component connected to the second end of the first tube component, the first fan component configured to discharge the air from the first tube component; and
    a control unit configured to turn on the first fan component in response to receiving a signal indicating that the vehicle is in an idle condition to prevent the air from exiting the first wheel well and reaching the radiator.

2. The apparatus of claim 1, wherein the first suction component is positioned at an angle such that the air released from an air outlet of the engine compartment is sucked into the first suction component, and
    wherein the first tube extends to a bottom of the vehicle to release the air away from the first wheel well toward the rear of the vehicle.

3. The apparatus of claim 1, wherein the first tube component is positioned substantially in parallel to a left or a right edge of the vehicle such that the second end of the first tube component is placed a predetermined distance away from the first wheel well.

4. The apparatus of claim 1, wherein the first fan component is positioned to draw the air out of the first tube component in an opposite direction of the front side of the vehicle while the first fan is operating.

5. The apparatus of claim 1, further comprising:
    a second suction component disposed within a second proximity to a second wheel well at a second side of the front side of the vehicle, the second suction component configured to draw the air released from the engine compartment of the vehicle;
    a second tube component having a third end connected to the second suction component and a fourth end extended to the direction towards a back of the vehicle, the second tube component configured to pass the air from the second suction component to the fourth end of the second tube component; and
    a second fan component connected to the fourth end of the second tube component, the second fan component configured to discharge the air from the second tube component.

6. The apparatus of claim 1, further comprising:
    a control unit configured to:
        turn on the first fan component in response to receiving a signal indicating that a temperature of the engine compartment or a computing component of the vehicle has exceeded a pre-defined threshold.

7. The apparatus of claim 1, further comprising:
    a control unit configured to:
        receive, from a global positioning system (GPS) component of the vehicle, a signal indicating that the vehicle has arrived at a location that belongs to a pre-defined list of locations associated with a power consumption for operating the vehicle exceeding a threshold; and
    turn on the first fan component in response to receiving the signal.

8. The apparatus of claim 1, further comprising:
    a first thermal detector disposed at a first radiator panel at the first side of the vehicle, the thermal detector configured to measure a first air inlet temperature at the first radiator panel;
    a first flow control component that is configured to conduct a first flow of heated coolant flow from a cooling mechanism of the vehicle to the first radiator panel in response to a first control signal from a control unit based at least in part on the first air inlet temperature;
    a second thermal detector disposed at a second radiator panel at a second side of the vehicle, the thermal detector configured to measure a second air inlet temperature at the second radiator panel; and
    a second flow control component that is configured to conduct a second flow of the heated coolant flow from the cooling mechanism of the vehicle to the second radiator panel in response to a second control signal from the control unit based at least in part on the second air inlet temperature.

9. The apparatus of claim 8, further comprising:
    the control unit configured to:
        compare the first air inlet temperature with the second air inlet temperature; and
        send the first control signal and the second control signal for adjusting the first flow control component and the second flow control component, respectively, to allocate a greater portion of the heated coolant flow to a flow control component having a lower air inlet temperature.

* * * * *